United States Patent [19]

Christianson et al.

[11] 4,019,827

[45] Apr. 26, 1977

[54] DRILL STOP

[75] Inventors: Merrill Andrew Christianson, Puyallup; Horace Earl Hill, Renton, both of Wash.

[73] Assignee: The Boeing Company, Seattle, Wash.

[22] Filed: Sept. 29, 1975

[21] Appl. No.: 617,620

[52] U.S. Cl. .......................... 408/202; 279/1 DC; 279/1 W; 403/104

[51] Int. Cl.[2] .................. B23B 47/00; B23B 49/00

[58] Field of Search ........... 408/202, 239, 226, 14, 408/112, 239; 403/104, 110; 248/410, 354 L; 279/1 DC, 95, 96, 1 W, 1 R; 254/106, 107

[56] References Cited

UNITED STATES PATENTS

| 754,502 | 3/1904 | Rockwell | 248/410 X |
| 1,031,914 | 7/1912 | Clouse | 408/239 X |
| 1,326,623 | 12/1919 | Voight | 403/104 X |
| 1,471,137 | 10/1923 | Bowman | 408/112 |
| 3,620,637 | 11/1971 | Brown | 408/202 |
| 3,737,136 | 6/1973 | Snurr | 403/104 X |

FOREIGN PATENTS OR APPLICATIONS 573,382  11/1945  United Kingdom ............... 403/110

*Primary Examiner*—Frank T. Yost
*Assistant Examiner*—Z. R. Bilinsky
*Attorney, Agent, or Firm*—Morris A. Case

[57] ABSTRACT

A housing to fit over a drill contains a pair of sleeves with facing inclined surfaces that approach each other to force a washer located between the surfaces into an inclined position to lock onto the drill. A spring located on each side of the washer extends to the adjacent sleeve.

17 Claims, 5 Drawing Figures

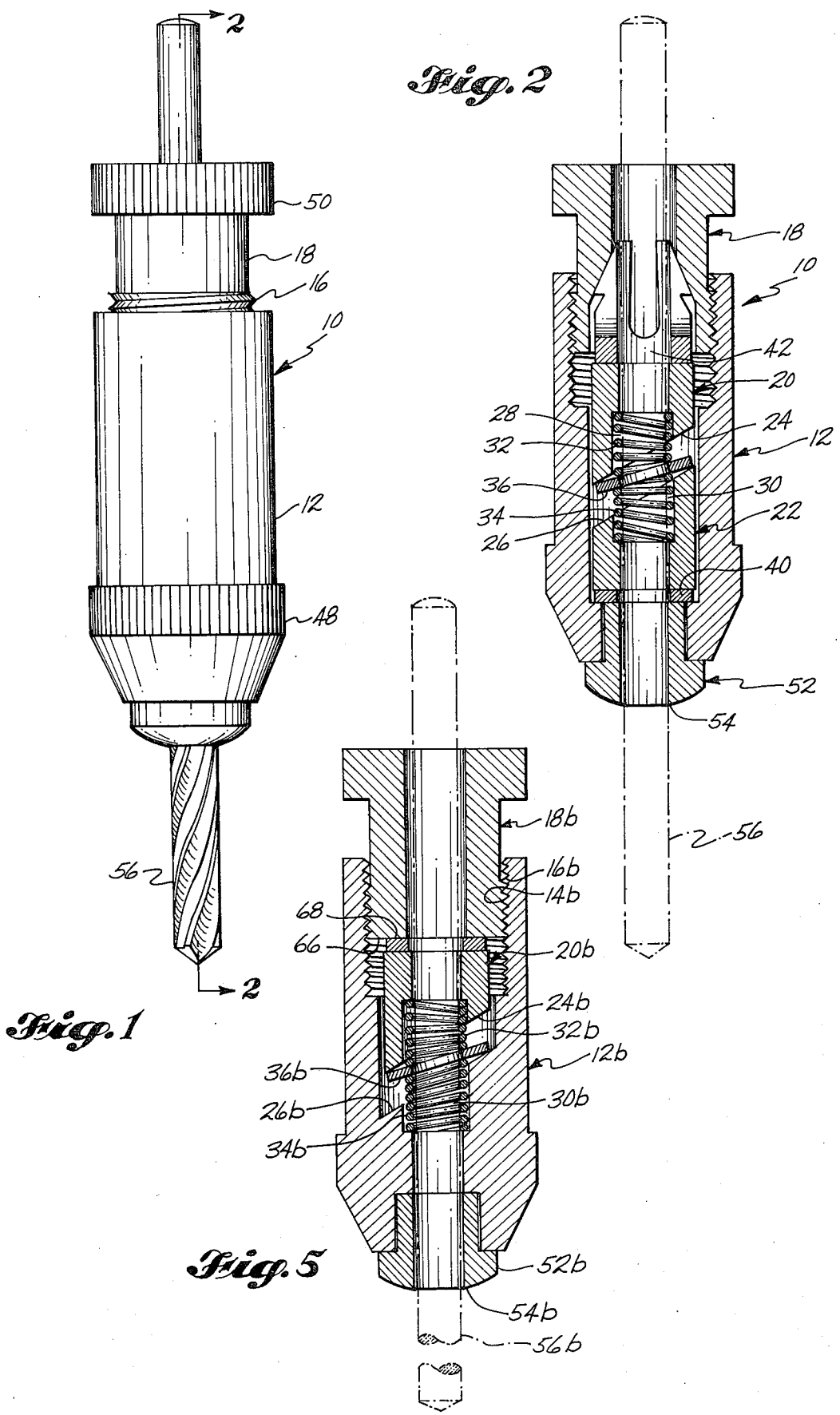

DRILL STOP

BACKGROUND OF THE INVENTION

Drill stops have long been used to control the depth of a hole being drilled. The most common devices require the use of a tool to lock the drill stop on a drill such as an Allen wrench for tightening a set screw or a wrench for tightening nuts used to wedge a ferrule onto the drill. U.S. Pat. No. 3,620,637 apparently does not require separate tools for locking. In that patent, a collet having resilient fingers at each end is wedged onto the drill with a pair of overriding members threaded together.

SUMMARY OF THE INVENTION

This positive locking drill stop may be quickly installed and or removed without requiring the use of tools. A housing that will accept the insertion of a drill has a pair of enclosed sleeves with facing inclined surfaces that tilt a washer therebetween to lock the inclined washer on an encircled drill. A member adjustably mounted to the housing moves the sleeve. A resilient member located on each side of the washer and extending to the adjacent sleeve acts to return the washer from the inclined position when the tilting force is removed.

It is an object of this invention to provide a hand set drill stop.

It is yet another object of this invention to provide a positive lock drill stop that will handle a range of drill sizes.

DESCRIPTION OF THE DRAWINGS

FIG. 1 shows a side elevational view of the drill stop of this invention mounted to a drill.

FIG. 2 shows a side elevational sectional view taken along lines 2—2 of FIG. 1.

FIG. 5 is a side elevation sectional view as in FIG. 2 but of yet another embodiment.

DETAILED DESCRIPTION

Figure 3:
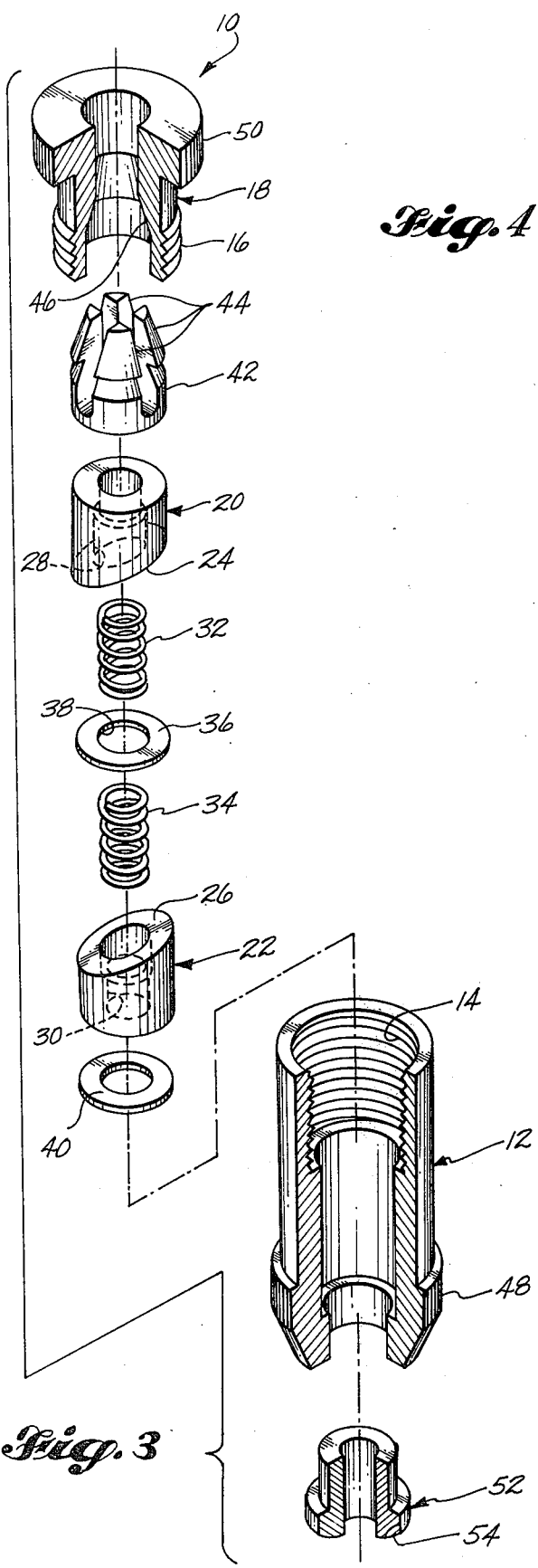
FIG. 3 shows an exploded perspective view partially in section of the drill stop of FIG. 1.

Drill stop 10 as best shown in FIGS. 2 and 3 has housing 12, with threads 14, to mate with the threads 16 on bushing 18 for adjustable mounting of the bushing to the housing. Located within the housing are several parts all of which encircle a drill when the drill stop is mounted. A pair of guides or sleeves 20 and 22 have facing inclined plane surfaces 24 and 26 respectively. In this embodiment the sleeves also have respective recesses 28 and 30 for accepting springs 32 and 34. Located between the sleeves with respective springs is a washer 36 which is preferably of metal which is hardened and has sharp interior edges 38. Also included in the parts inside the housing or casing 12 is a washer 40 and a flexible or elastomeric collet 42. The collet has fingers 44 which are wedged radially inward by tapered sides 46 of bushing 18 when the bushing is advanced. The housing or casing and the bushing are preferably a plastic such as nylon, and are preferably knurled such as is shown at 48 and 50 respectively to assist in hand adjusting. An insert 52 preferably of metal is pressed into the housing to act as a working surface 54 to contact a work piece not shown when the drill stop 10 bottoms out.

In operation the internal parts are placed to encircle a drill 56 in the order as best shown in FIGS. 2 and 3, the drill with the encircling internal parts inserted into the housing 12 and the bushing 18 threaded onto the housing. The required depth for the drill is determined and the bushing advanced into the housing. This forces the sleeves 20 and 22 toward each other and as they are free to rotate they line up with inclined plane surfaces 24 and 26 essentially parallel with the washer 36 tilted therebetween in an inclined position which locks the washer onto drill 56 to prevent relative axial movement. At the same time the fingers 44 of the flexible collet 42 are forced radially inward by tapered surface 46 of the bushing 18 to compress and lock the flexible collet between the drill and the bushing to prevent rotational movement. The locking washer and the flexible collet permit use over a range of sizes of drills. To remove or to readjust the drill stop, the bushing is retracted to release the collet and allow the sleeves 20 and 22 to move apart. Springs 32 and 34 which extend between a side of the locking washer 36 and an adjacent sleeve then act upon the washer to move it from the inclined position to be essentially vertical to the axis of the drill.

Figure 4:
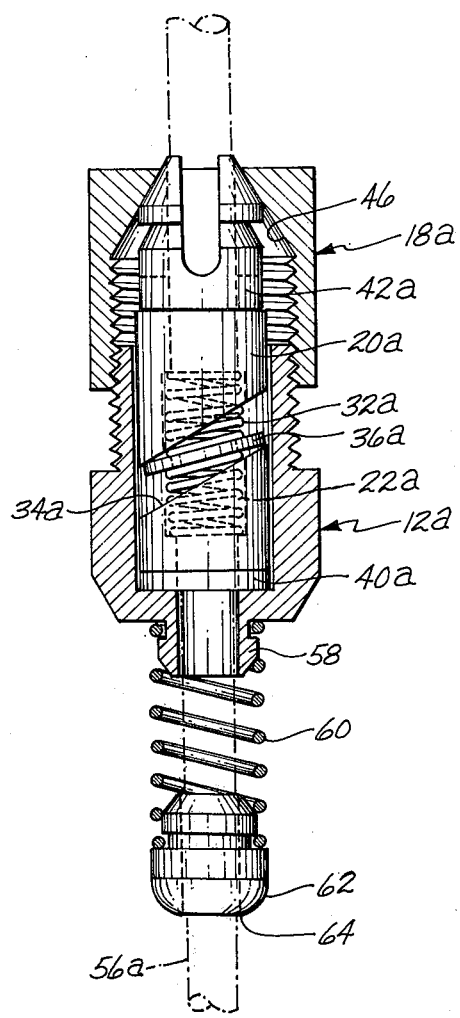
FIG. 4 is a side elevation sectional view similar to FIG. 2, but of a different embodiment.

FIG. 4 shows a different embodiment which includes means for absorbing shock when the stop contacts a working surface. In this embodiment, housing 12a has a projecting nose part 58 which is used to mount a spring 60; which extends to and is mounted upon a working piece 62 with working surface 64. This embodiment has internal parts to include sleeves 20a and 20b, springs 32a and 34a to act upon washer 36a to lock the washer upon the drill and collet 42a to be acted on by tapered surface 46a of bushing 18a. In this embodiment, housing 12a has threads 14a to mate with threads 16a of the bushing 18a to provide the force to lock the drill to the drill stop.

In operation, the drill stop of this embodiment is set to give a drill depth from the working surface 64 when the spring 60 is completely compressed. When drilling the contacting work surface 64 yields till the spring is completely compressed to absorb the shock of contact.

FIG. 5 shows yet another embodiment. Housing 12b has insert 52b with working surface 54b, threads 14b, recess 30b, and on integral internal inclined surface 26b. This inclined surface works in conjunction with inclined surface 24b of sleeve 20b. Bushing 18b has threads 16b to mate with the threads in the housing. The bushing has an essentially flat surface 66. A washer 58 rests between the bushing and sleeve 20b. When the bushing is advanced in the housing the sleeve is free to rotate and will align with inclined surface 24b essentially parallel to inclined surface 26b of the housing to exert pressure on washer 36b to tilt that washer into an inclined position to lock the drill axially and rotationally to the housing. Springs 32b and 34b return the washer to an upright position when the bushing retracts to remove the retaining sleeve. The inclined surface 26b was shown as an integral part of the housing, however, a sleeve having an inclined surface may be used that may be attached to the housing such as by the use of interference fit, the use of pins or other known means for unifying the housing and a sleeve having an inclined surface to prevent relative movement between the two.

We claim:

1. A drill stop comprising: a washer located inside a housing to encircle a drill extending along a longitudinal axis, means for forcing the washer between sleeves having facing inclined surfaces into an inclined position with respect to said longitudinal axis for locking to the drill, and resilient means for releasing the washer from the drill when the means for forcing the washer is removed.

2. A drill stop as in claim 1 further comprising a work contacting working piece and means between said housing and said working piece for absorbing shock with a compressible spring when the drill stop working piece contacts a working surface.

3. A drill stop adapted to encompass a drill having a longitudinal axis, said drill stop comprising: means for forcing a washer, located within a housing, into an inclined position with respect to said axis between a pair of sleeves having facing inclined surfaces for locking the washer onto a drill; means for locking the drill, which is locked to the washer, to the housing; and means for releasing the washer.

4. A drill stop as in claim 3 further comprising a work contacting working piece and means between said housing and said working piece for absorbing shock with a compressible spring when the drill stop working piece contacts a working surface.

5. A drill stop comprising: a housing having an opening adapted to accept insertion of a drill extending along a longitudinal axis, a pair of sleeves located within the housing to encircle the drill and having facing surfaces inclined with respect to said axis, a washer located between the sleeves to encircle the drill, means for forcing the sleeves toward each other to force the washer into an inclined position to lock on the drill, and means for moving the washer from an inclined position when the means for forcing the sleeves together is removed.

6. A drill stop as in claim 5 further comprising means for locking the drill, which is locked to the sleeves through the washer, to the housing by unifying the housing and one of the sleeves to prevent relative movement between the sleeve and the housing.

7. A drill stop as in claim 6 further comprising a work contacting working piece and means between said housing and said working piece for absorbing shock with a compressible spring when the drill stop working piece contacts a working surface.

8. A drill stop as in claim 5 further comprising means for locking the locked drill to the housing and said means comprises a flexible collet compressed between the drill and the housing.

9. A drill stop as in claim 8 further comprising a work contacting working piece and means between said housing and said working piece for absorbing shock with a compressible spring when the drill stop working piece contacts a working surface.

10. A drill stop as in claim 8 wherein the means for moving the washer from an inclined position when the means for forcing the sleeves together is removed comprises a resilient member extending from each sleeve to a side of the washer.

11. A drill stop as in claim 10 wherein the resilient member is a spring.

12. A drill stop as in claim 6 wherein the means for moving the washer from an inclined position when the means for forcing the sleeves together is removed comprises a resilient member extending from each sleeve to a side of the washer.

13. A drill stop as in claim 12 wherein the resilient member is a spring.

14. A drill stop adapted to encompass a drill having a longitudinal axis, said drill stop comprising: a housing to accept insertion of a drill; a pair of sleeves located within the housing to encircle the drill and having facing complementary surfaces inclined to said axis; a flexible collet to encircle the drill and located adjacent one of the sleeves; a washer located between the sleeves to encircle the drill; a member adjustably mounted to the housing to move the sleeves together to axially lock the drill by the washer now tilted between the facing complementary inclined surface of the sleeves and to compress the flexible collet to prevent rotation between the housing and the drill when the adjustable member advances, and to release when the adjustable member retracts, and a resilient member extending between each sleeve and a side of the washer to return the washer from the inclined position when the adjustable member retracts.

15. A drill stop as in claim 14 further comprising: a working member to contact a work piece, and a spring extending between the working member and the housing to cushion contact between the drill stop and a work piece.

16. A drill stop adapted to encompass a drill having a longitudinal axis, said drill stop comprising: a housing to accept insertion of a drill; a pair of sleeves located within the housing to encircle the drill and having facing complementary surfaces inclined to said axis, one of said sleeves being integral with the housing; a washer located between the sleeves to encircle the drill; a resilient member to extend between each sleeve and a side of the washer; and a member adjustably mounted to the housing to move one of the sleeves into complementary relation with the inclined surface of the integral sleeve to force the washer into an inclined position to lock the washer and the housing to the drill when the adjustably mounted member advances and to release the washer from the drill when the drill retracts.

17. A drill stop as in claim 16 further comprising: a working member to contact a work piece, and a spring to extend between the working member and the housing.

* * * * *